United States Patent [19]

Pavlath

[11] Patent Number: 4,729,622

[45] Date of Patent: Mar. 8, 1988

[54] FIBER OPTIC POLARIZER WITH ERROR SIGNAL FEEDBACK

[75] Inventor: George A. Pavlath, Thousand Oaks, Calif.

[73] Assignee: Litton Systems, Inc., Beverly Hills, Calif.

[21] Appl. No.: 557,844

[22] Filed: Dec. 5, 1983

[51] Int. Cl.[4] .......................... G02B 6/26; G02B 6/09; G02B 5/30
[52] U.S. Cl. ............................... 350/96.15; 350/96.29; 350/371; 350/387; 350/405; 350/407; 356/350
[58] Field of Search ............... 350/96.10, 96.15, 96.29, 350/96.30, 370, 371, 384, 387, 400, 403, 405, 407; 356/350

[56] References Cited

U.S. PATENT DOCUMENTS

| | | | |
|---|---|---|---|
| 3,625,589 | 12/1971 | Snitzer | 350/370 |
| 3,645,603 | 2/1972 | Smith | 350/371 |
| 3,819,939 | 6/1974 | Rahlff | 250/225 |
| 3,990,036 | 11/1976 | Savit | 340/15.5 |
| 4,089,582 | 5/1978 | Mahlien et al. | 350/96.13 |
| 4,139,262 | 2/1979 | Mahlien et al. | 350/96.33 |
| 4,268,116 | 5/1981 | Schmadel et al. | 350/96.29 |
| 4,386,822 | 6/1983 | Bergh | 350/96.15 |
| 4,389,090 | 6/1983 | LeFevre | 350/96.29 |
| 4,410,275 | 10/1983 | Shaw et al. | 356/350 |
| 4,431,260 | 2/1984 | Palmer | 350/96.15 |
| 4,456,377 | 6/1984 | Shaw et al. | 356/350 |
| 4,461,574 | 7/1984 | Shaw et al. | 356/350 |
| 4,515,441 | 5/1985 | Wentz | 350/395 |
| 4,529,312 | 7/1985 | Pavlath et al. | 356/350 |
| 4,583,818 | 4/1986 | Chen et al. | 350/96.19 |
| 4,589,728 | 5/1986 | Dyott et al. | 350/96.30 |
| 4,607,912 | 8/1986 | Burns et al. | 350/96.30 |

FOREIGN PATENT DOCUMENTS

| | | |
|---|---|---|
| 3035153A1 | 4/1982 | Fed. Rep. of Germany. |
| 3150697 | 7/1983 | Fed. Rep. of Germany. |
| 3305104A1 | 8/1984 | Fed. Rep. of Germany. |
| 84/02006 | 5/1984 | World Int. Prop. O.. |

OTHER PUBLICATIONS

Eickhoff, "In-Line Fibre Optic Polariser", Electronics Lett., 9/80, vol. 16, No. 20, pp. 762-764.
Pavlath et al., Proc. SPIE Int. Soc. Opt. Eng., vol. 412, p. 70, Apr. 5-7, 1983.
Giese et al., "Single-Loop Polarization Stabilization for Single-Mode Fiber", 1982, Optics letters, vol. 7, No. 7, pp. 337-338.
Hosaka et al. "Fabrication of Single-Mode Fiber-Type Polarizer", Optics Letters, vol. 8, No. 2, Feb. 1983, pp. 124-126.
Hosaka et al., "Single-Mode Fiber-Type Polarizer". IEEE J. of Q. Elect., vol. QE-18, No. 10, Oct. 1982, pp. 1569-1572.
Mohr; F. A. and Scholz; U. "Polarization Control for an Optical Fiber Gyroscope", Fiber Optic Rotation and Related Technology, Springer Verlag, 1982, pp. 163-168.
Ulrich; R., "Polarization Stabilization on Single-Mode Fiber", Appl. Phys. Lett., 35 (11), 12/01/79, pp. 840-842.
Kintner; E. C., "Polarization Problems in Optical Fiber Gyroscopes", Applied Optics, pp. 78-81.

(List continued on next page.)

Primary Examiner—Stephen C. Buczinski
Attorney, Agent, or Firm—John H. Lynn

[57] ABSTRACT

This invention provides apparatus and methods for converting a lightwave of an arbitrary polarization propagating in a single mode optical fiber into a wave having a single linear polarization state. A polarization couples light of an undesired polarization out of the fiber, and a photodetector produces an error signal responsive to light coupled from the fiber. Control circuitry processes the error signal to produce control signals which are input to a polarization of light input to the polarizer to null the error signal. With the error signal maintained at a minimum value the light input to the polarizer and, hence, the light ouput therefrom is a wave having only the desired linear polarization.

21 Claims, 8 Drawing Figures

OTHER PUBLICATIONS

Lefevre et al., "Progress in Optical Fiber Gyroscopes Using Integrated Optics".

Johnson; M., "In-Line Fiber-Optical Polarization Transformer", *Appl. Optics*, vol. 18, No. 9, 1 May 1979, pp. 1288–1289.

Pavlath et al. "Fiber Optic Gyroscopes: Advances and Future Developments", Navigation: Journal of the Institute of Navigation, vol. 31, No. 2, Summer 1984, pp. 70–83.

Alekseev et al., "Polarization Modulation of the Radiation in a Single-Mode Fiber Lightguide", Sov. Tech. Lett. 5 (7), Jul. 1979, pp. 367–368.

Flanders; D. C., "Submicrometer Periodicity Gratings as Artificial Anisotropic r Dielectrics", Appl. Phys. Lett., 42 (6), 15 Mar. 1983, p. 492.

Dandridge et al., "Phase Compensation in Interferometric Fiber-Optic Sensors", Optics Letters, Jun. 1982, vol. 7, No. 6, pp. 279–281.

Gruchmann; D. et al., "Fiber Optic Polarizers with High Extinction Ratio," *ECOC*-83, 1983, pp. 305–308.

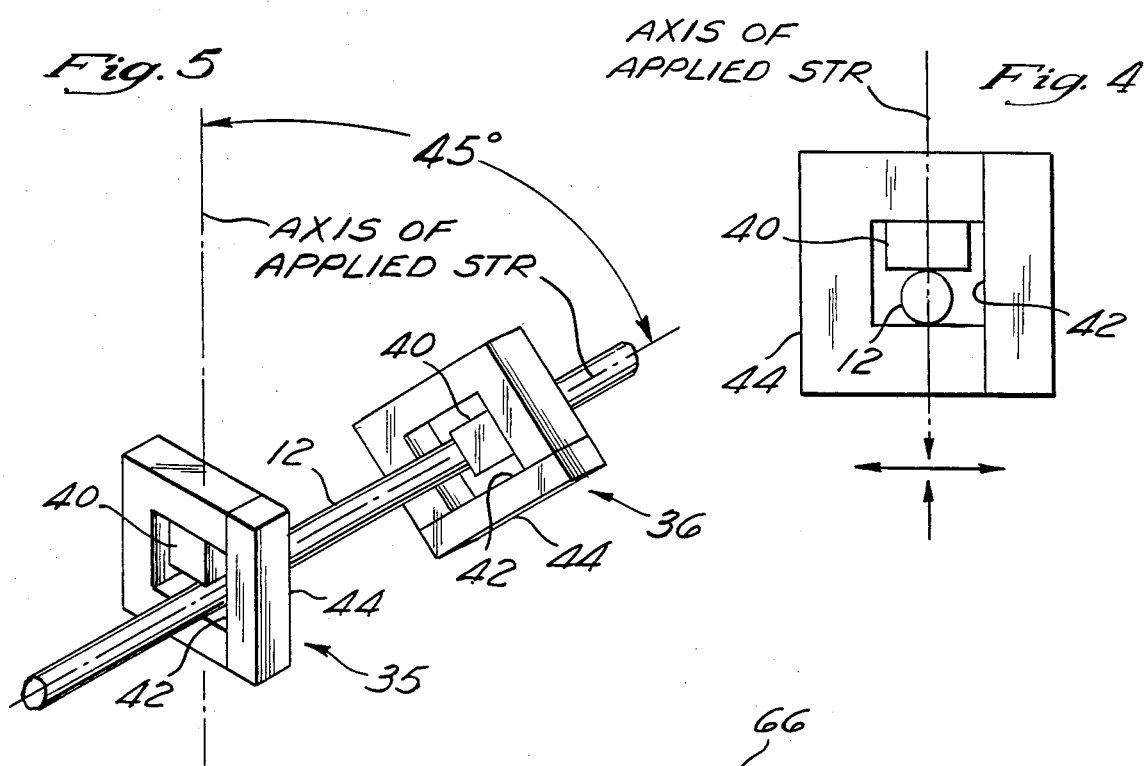
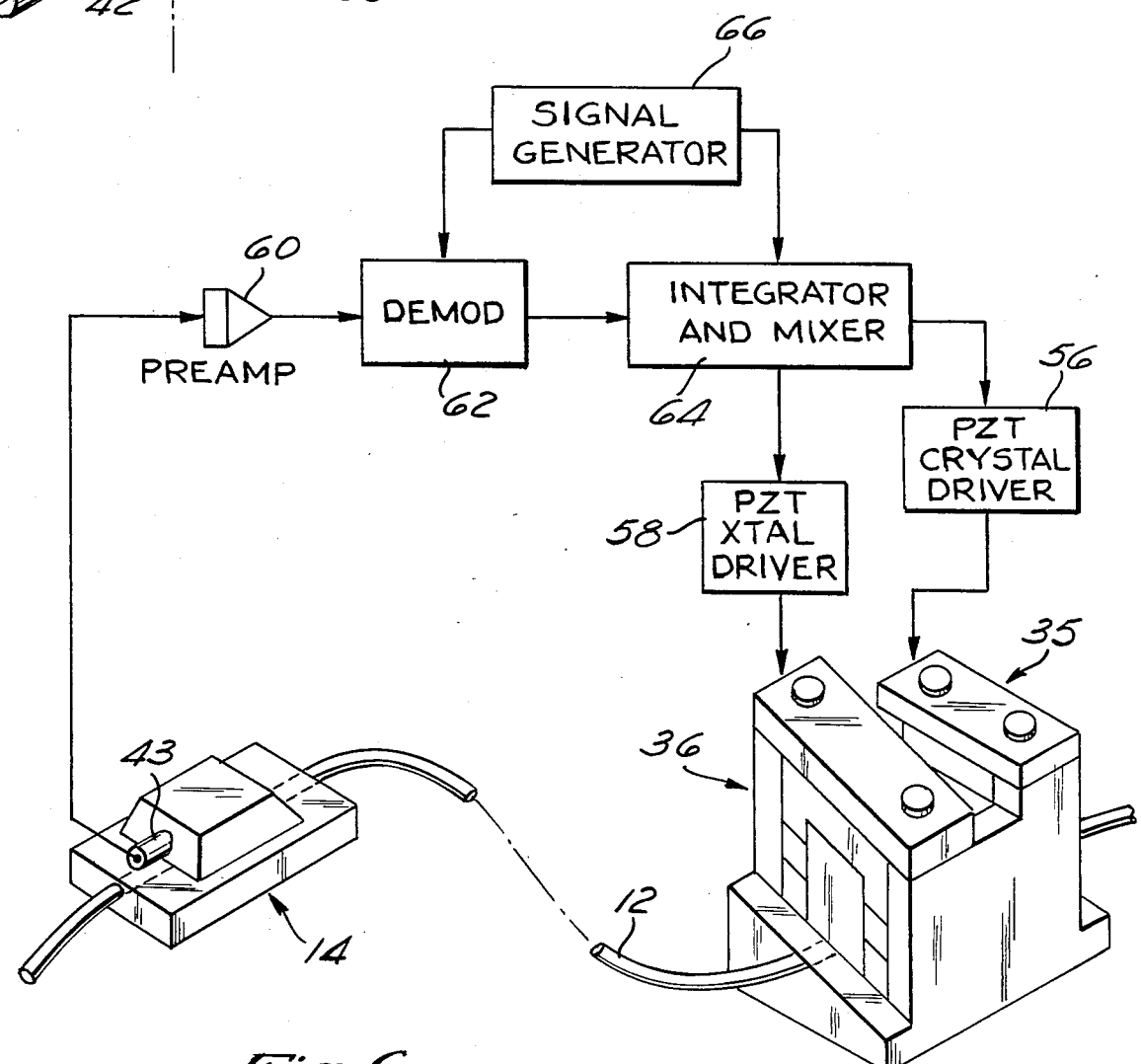

FIBER OPTIC POLARIZER WITH ERROR SIGNAL FEEDBACK

BACKGROUND OF THE INVENTION

This invention relates generally to apparatus and methods for polarizing light and particularly to fiber optic apparatus and methods for providing light of a predetermined polarization. Still more particularly, this invention relates to a polarizer system including a feedback loop which provides an error signal porportional to the intensity of a selected polarization mode propagating in the fiber and means for nulling the error signal.

It is well known that in many fiber optic systems, it may be desirable to have light of a known polarization state at selected points for input to components whose operation is polarization dependant to minimize errors. The state of polarization is particularly important in a device such as an optical fiber gyroscope. In a polarized optical fiber gyroscope system, drift errors due to polarization are determined by the quality of the polarizer and by the control of the state of polarization.

A linear polarization state is typically achieved with some type of linear polarizer such as the fiber optic polarizer described in U.S. Pat. No. 4,386,822 to Bergh. The polarization state input to the polarizer is arbitrary in general. The polarizer couples light of undesired polarizations out of the fiber and permits light having only a selected desired polarization to propagate through the fiber. If none of the incident light has the desired polarization, then the insertion loss is 100% and no signal passes through the polarizer.

An improved apparatus for producing light of a known polarization includes a polarization controller placed in the fiber between the light source and the polarizer with the polarization controller being adjusted to output light of the desired polarization into the polarizer. However, in a typical system, the polarization state input to the polarization controller varies due to the environmental sensitivities of the optical fiber. Variations in temperature and pressure, vibrations, and ageing of the materials may cause significant changes in the polarization output from the polarization controller to the polarizer. Therefore, in a system which includes a polarization controller fixed to vary the polarization of input light by a predetermined amount, the time varying polarization of the light input to the polarization controller causes signal fading.

Most fiber optic gyroscope systems thusfar demonstrated include a number of bulk optic devices. These bulk optic devices include mirrors, lenses, beam splitters, prisms, and Bragg cells, for example. Although each of the bulk optic devices needed to implement a fiber optic gyroscope system currently exists, the losses, light scatter and non-reciprocal optical properties which they introduce into the system seriously degrade the performance of the gyroscope system even when the bulk optic devices are of the finest possible optical quality. Experiments have shown that an all-optical fiber gyroscope system can achieve a noise level of about 0.001 deg/(hr) ½. The best bulk optics equivalent has a noise level which is many times poorer than that of the all-fiber system.

In addition to purely optical limitations, bulk optics elements introduce limitations on packaging size, severe design constraints in the ability to withstand the temperature range required by typical military specifications, and potential sources of vibration sensitivity. Bulk optics devices of the required quality are extremely expensive, and experience has shown that it is unlikely that significant cost reductions can be achieved in the production of such bulk optic devices.

The performance of a fiber optic rotation sensor depends critically upon the state of polarization in the fiber. The state of polarization in a fiber is very much dependent upon environment, but the state of polarization can be electronically controlled.

A fiber optic polarization controller is a 2-port device which transforms an arbitrary input state of polarization into a desired output state of polarization. This transformation is accomplished by placing two adjustable birefringent sections in the optical path. The application of anisotropic stresses to the fiber induces birefringence through the photoelastic effect. The photoelastic effect relates the change in the indices of refraction of the fiber to the applied stress. Anisotropic stresses may be applied to the fiber by squeezing the fiber or by bending the fiber around a circular form. Bending the fiber around a circular form has been used with great success in the laboratory by manual adjustment of the angular positions of the circular forms, but such polarization controllers have not been found to be suitable in the construction of small and simple servomechanism for controlling the state of polarization in an optical fiber.

Experiments have been done on polarization stabilization in single-mode optical fiber using two electromagnetic fiber squeezers. These experiments use bulk optic devices to examine the state of polarization of the light exiting the fiber and to provide a feedback signal to control the electromagnetic squeezers. The apparatus used in these experiments has the disadvantages of requiring access to the ends of the fiber, being excessively bulky and having a high insertion loss.

In order to achieve the benefits which may be derived from the all-fiber approach to optical gyroscopes, suitable optical components must be available in forms adaptable to fabrication on a single fiber in order to minimize the losses and back-scattering techniques associated with splices. The components must be relatively small, lightweight, easily packagable and capable of meeting stringent operational specifications to provide an optical gyroscope system suitable for military and civilian guidance applications.

SUMMARY OF THE INVENTION

The present invention provides a system for polarization control in a single fiber that is suitable for use in constructing an all-fiber gyroscope system.

The present invention provides a fiber optic polarizer system having a linearly polarized output which is essentially constant in time. The invention includes a polarizer which uses a birefringent material in contact with a fiber optic waveguide to guide light of a first selected polarization out of the waveguide while permitting light of a second selected polarization to pass unattenuated through the fiber optic waveguide. The system uses the light radiated from the fiber into the birefringent material in the direction of propagation of the input wave as an error signal which is fed back through control circuitry to a polarization controller which controls the polarization of light incident upon the polarizer. The polarization controller preferably uses piezoelectric squeezers and includes a piezoelectric element which acts as an actuator to provide a stress to the fiber porportional to an applied electric field. Photodetectors sensitive to the wavelength of light within the birefringent material pick up the error signal and produce an electrical signal porportional to the optical power of the error signal.

The control circuitry processes the electrical error signal to produce control signal outputs that are applied to the polarization controller to null the error signal. Thus the polarizer system of the invention includes negative feedback circuitry which controls the polarization controller to minimize the error signal. The result is that light having the desired polarization and constant magnitude is propagated through the polarizer system for input to other optical components.

The present invention is a compact, all fiber optic system with no bulk optics and which accomplishes the desired result of providing constant intensity, light having a single polarization without requiring access to ends of the fiber.

BRIEF DESCRIPTION OF THE DRAWINGS

FIG. 4 is a schematic representation of a piezoelectric squeezer used to control polarization of light in an optical fiber;

FIG. 5 illustrates application of two piezoelectric fiber squeezers to an optical fiber to control the polarization of light propogating therethrough;

FIG. 6 is a schematic showing structure of the controller of FIG. 1 and connection thereof to the piezoelectric squeezers of FIG. 5;

DESCRIPTION OF THE PREFERRED EMBODIMENT

Figure 1:
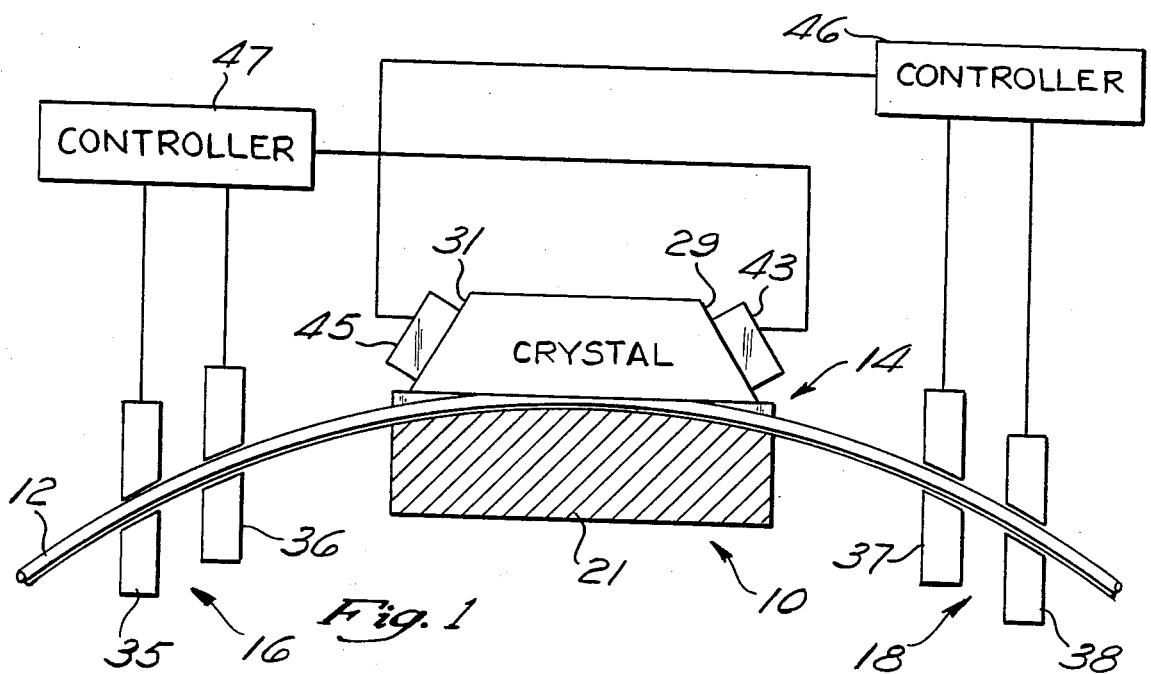
FIG. 1 is a schematic representation of the invention.

Referring to FIG. 1, a fiber optic polarizer system 10 includes a fiber optic waveguide 12, a polarizer 14 and a pair of polarization controllers 16 and 18.

Figure 2:
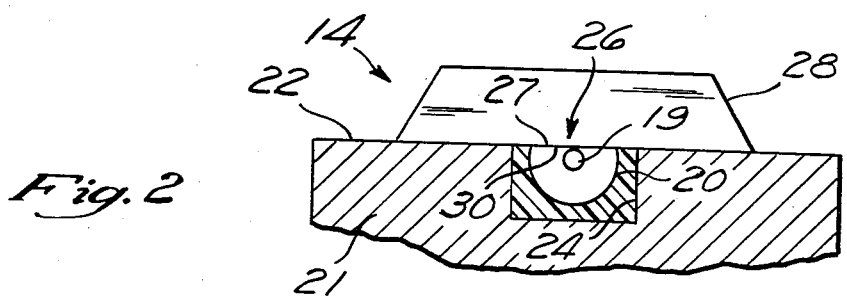
FIG. 2 is a cross-sectional view taken along line 2—2 of FIG. 1.

As best shown in FIG. 2, the fiber optic waveguide 12 is preferably a single mode optical fiber having a central core 19 and a surrounding cladding 20 as is well known in the art. For single mode operation, the core 19 typically has a diameter on the order of 1–10 microns, and the cladding 20 has a diameter on the order of 100 microns. Although the illustrated embodiment employs a single mode optical fiber having a step gradient in the index of refraction between the core and the cladding, the invention is not limited to such fibers and may be implemented with other fibers such as graded index single and multi-mode fibers.

A polarizer suitable for use in the present invention is disclosed in U.S. Pat. No. 4,386,822 to Bergh. The disclosure of that patent is hereby incorporated by reference herein.

POLARIZER

Referring to FIGS. 1 and 2, the polarizer 14 includes a substrate 21 having an optically flat surface 22 thereon. The fiber optic waveguide 12 is mounted within an arcuate slot 24 formed in the optically flat surface 22 of the substrate 21. Since the primary function of the substrate 21 is to hold the fiber optic waveguide 12 in a predetermined position, the substrate 21 may be formed of any suitably rigid material. In the preferred embodiment, the substrate 21 comprises a block of fused quartz; and a suitable cement, such as epoxy glue, secures the fiber optic waveguide 12 in the slot 24.

As best shown in FIG. 2, in the central region of the substrate 21 the depth of the slot 24 is less than the diameter of the fiber optic waveguide 12, and the outer portion of the cladding 20 is removed to form an interaction zone 26 from which light may be coupled out of the fiber optic waveguide 12. The cladding 20 is removed in the interaction zone 26 to form a flat surface 28 that is coplanar with the optically flat surface 22 of the substrate 21. At the edges of the substrate 21 the depth of the slot 24 is preferably at least as great as the diameter of the fiber optic waveguide 12 so that the cladding 20 remains intact. Therefore, the amount of cladding 20 removed increases gradually from zero at the edges of the substrate 21 to a maximum near the center thereof in the interaction zone 26.

A crystal 28 formed of a birefringent material is mounted on the substrate 21 in close proximity to the core 19 of the fiber optical waveguide 12 in the interaction zone 26. The crystal 28 has an optically flat surface 30 facing the optically flat surface 22 of the substrate 21. The crystal 28 is positioned to partially intersect the path of light propagating in the fiber optic waveguide 12 so that evanescent field coupling may couple light from the fiber optic waveguide into the crystal 28. In a preferred embodiment, the diameter of the core portion 19 is on the order of 4 microns, and the separation between the crystal 28 and the core 19 is on the order of 1 micron. In this embodiment, the arcuate slot 24 has a radius of curvature on the order of 20 centimeters, and the interaction region 26 between the fiber optic waveguide 12 and the crystal 28 is approximately 1 millimeter long.

The crystal 28 comprises a body of birefringent material in order to provide different wave velocities therein for light of different polarizations. With polarizations for which the wave velocity in the crystal 28 is less than the wave velocity in the fiber optic waveguide 12, the light carried by the fiber optic waveguide 12 excites a bulk wave in the crystal 28, which causes light to escape from the fiber optic waveguide 12. No bulk wave is excited in the crystal 28 for polarizations having wave velocities in the crystal greater than in the fiber so that light having such polarizations remains guided by the fiber optic waveguide 12. Therefore, proper selection and orientation of the crystal 28 of birefringent material causes light of a first selected polarization to be retained within the fiber optic waveguide 12 while light of a second selected polarization is removed therefrom and transmitted away from the fiber optic waveguide 12 through the crystal 28. The indices of refraction of the crystal 28 are such that a wave having polarization along one of the principal axis of the crystal 28 will propagate more slowly in the crystal 28 than in the fiber optic waveguide 12; and a wave having polarization along a second principal axis will propagate at a greater speed in the crystal 28 than in a fiber optic waveguide 12.

The crystal 28 is chosen to have at least one refractive index that is equal to or greater than the refractive index of the core 20 of the fiber optic waveguide 12 and a second refractive index that is equal or less than the refractive index of the cladding 20. In a preferred embodiment, the crystal 28 has one index of refraction that is greater than the index of refraction of the core 19 and two indices of refraction that are less than the index of refraction of the cladding 20. This relationship of refractive indices permits orientation of the crystal 28 to adjust the lossiness of one polarization without affecting the lossiness of other polarizations. In the illustrated embodiment, the crystal 28 is preferably cut so that the axis of the largest index of refraction lies in the plane of the optically flat surface 30.

In a preferred embodiment, the core 19 of the fiber optic waveguide 12 is formed of ammorphous silica having an effective index of refraction of approximately 1.46; and the crystal 28 comprises a potassium pentaborate ($KB_5O_8.4H_2O$) crystal having the following refractive indices at a wave length of 633 nm in vacuo: $n_a=1.49$, $n_b=1.43$, and $n_c=1.42$, where a, b and c correspond to the axes of symmetry of the crystal 28. The crystal 28 is cut in a plane perpendicular to the vertical b axis; and the cut surface 30 is polished and placed against the fiber optic waveguide 12 in the interaction region 26. For light polarized perpendicular to the crystal-fiber interface 30, the refractive index ($n_b=1.43$) of the crystal 28 is less than the refractive index 1.46 of the fiber optic waveguide 12, which causes light propagating within the fiber optic waveguide 12 to remain therein because of total internal reflections at the crystal-fiber interface 30.

The index of refraction n for polarization parallel to the crystal-fiber interface 30 lies between $n_c=1.42$ and $n_a=1.49$ according to the following relationship:

$$n \approx \left[ \frac{\sin^2 \theta}{n_c^2} + \frac{\cos^2 \theta}{n_a^2} \right]^{-\frac{1}{2}}$$

where $\theta$ is the angle between the direction of propagation and the c axis of the crystal. In an effective polarizer the orientation and refractive index of the crystal 26 are chosen to make the slower wave velocity in the crystal 28 very close to the wave velocity within the fiber optic waveguide 12, since it has been found that the efficiency of coupling from the fiber optic waveguide 12 to the crystal 28 increases as the wave velocity in the crystal 28 becomes closer to the wave velocity in the fiber optic waveguide 12.

In a preferred method of assembly, the fiber optic waveguide 12 is bonded into the arcuate slot 24 using an appropriate cement, and the fiber optic waveguide 12 and substrate 21 are ground and polished together until the desired amount of cladding 20 has been removed from the fiber optic waveguide 12 in the interaction region 26. The polished face 30 of the crystal 28 is then placed against the surface of the substrate 21, and pressure is applied to reduce the separation therebetween to a fraction of a micron. An index matching oil having an index of refraction of approximately 1.45 is inserted between the crystal 28 and the fiber optic waveguide 12 by means of capillary action to provide optical matching between the crystal 28 and the fiber optic waveguide 12 and to reduce frictional forces that must be overcome to properly position the crystal 28 on the substrate 21.

Figure 3:
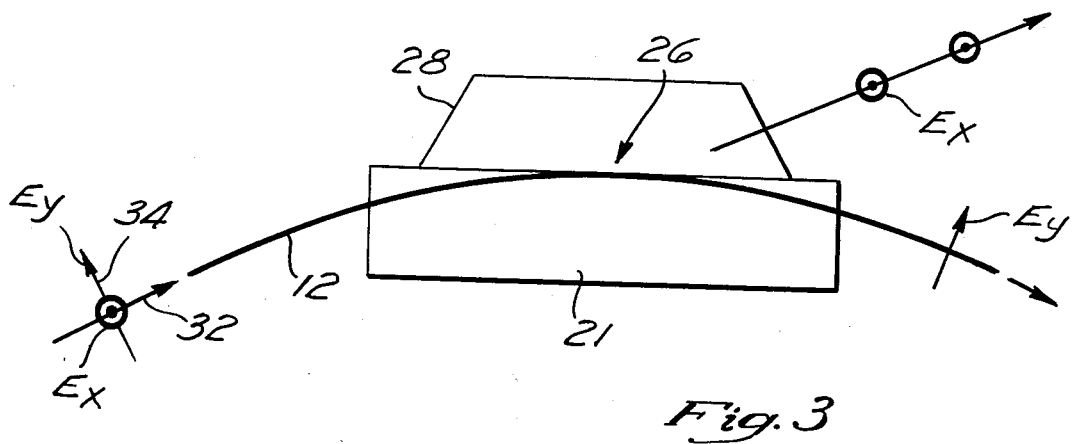
FIG. 3 is an elevation view of the apparatus of FIG. 2.

Referring to FIG. 3, a transverse electromagnetic (TEM) wave typically has two modes of polarization in a single mode fiber. The light input to the polarizer 14 is represented by a first arrow 32 which indicates the direction of propagation of the light wave and a second arrow 34 perpendicular to the arrow 32 to indicate one direction of polarization. The other direction of polarization is indicated by the circle with a dot in the center thereof at the intersection of the arrows 32 and 34. The circle and dot represent a polarization vector pointing out of the plane of the page parallel to the optically flat surfaces 30 and 22. With the crystal 28 being cut and oriented with respect to the fiber optic waveguide 12 as described above, the index of refraction of the crystal 28 for light represented by the polarization vector 34 is less than the effective index of refraction of the fiber optic waveguide 12 so that light having polarization indicated by the polarization vector 34 propagates past the crystal 28 through the fiber optic waveguide 12 by means of total internal reflection at the crystal-fiber interface. For light polarized parallel to the crystal-fiber interface 30, the index of refraction of the crystal 28 is approximately equal to or greater than the effective index of refraction of the fiber so that the wave velocity in the crystal 28 for this polarization is approximately equal to or less than the wave velocity in the fiber optic waveguide 12. Therefore, light polarized parallel to the crystal-fiber interface 30 excites a bulk wave in the crystal 28 and escapes from the fiber optic waveguide 12. The result is that the light which remains within the fiber optic waveguide 12 is highly polarized in the direction perpendicular to the plane 30 of the crystal 28.

The extinction ratio of the polarizer 14 is the ratio of light having the undesired polarization mode retained in the fiber optic waveguide 12 to the light of the desired polarization mode retained within the fiber optic waveguide 12, assuming equal inputs of both modes into polarizer 14. The polarizer 14 constructed in accordance with the foregoing description is capable of providing an extinction ratio in excess of 80 dB, with a throughput loss of light of the desired polarization of only a few percent. The two most important parameters of the polarizer 14 are the extinction ratio and the insertion loss. Optical gyroscopic applications require extinction ratios greater than 80 dB and insertion loss of less than 10%. The polarizer 14 is capable of achieving an extinction ratio of about 100 dB while the best bulk optic polarizers have extinction ratios of about 50-60 dB.

POLARIZATION CONTROLLER

The performance of fiber optic apparatus such as inertial sensors (not shown) depends critically upon the state of polarization in the fiber. The fiber optic polarizer system 10 of the present invention electronically controls the state of polarization in the fiber optic waveguide 12, taking an arbitrary input state of polarization and transforming it into a desired output state of polarization. The polarization transformation is accomplished by placing two adjustable birefringent sections in the optical path of light guided in the fiber optic waveguide 12 to control the state of polarization input to the polarizer 14.

Each of the polarization controllers 16 and 18 includes a pair of fiber squeezers 35, 36 and 37, 38, respectively to apply anisotropic stresses to the fiber optic waveguide 12 to induce birefringence through the photoelastic effect. The photoelastic effect changes the indices of refraction of the fiber in response to the applied stress. Referring to FIGS. 4 and 5, each of the fiber squeezers 35-38 comprises a piezoelectric actuator element 40 mounted inside a rectangular aperture 42 in a generally rectangular frame 44. One end of the piezoelectric actuator element 40 is rigidly connected to the frame; and the other end of the piezoelectric actuator element contacts the fiber optic waveguide 12, which is held between the piezoelectric element and a portion of the frame. It is well-known that application of an electric field to a piezoelectric material produces a stress therein in a repeatable, predictable manner in response to the applied electric field. Ordinarily the stress produced in the piezoelectric actuator element 40 is proportional to the applied electric field.

It has been found that transformation from an arbitrary eliptical state of polarization to an arbitrary output state of polarization requires three fiber squeezers. The fiber optic polarizer system 10 includes the pair of fiber squeezers 35, 36 at one side of the polarizer 14 and the pair of fiber squeezer 37, 38 at the opposite side of the polarizer 14 to change an arbitrary state of polarization input from either direction to a specific linear state of polarization at the polarizer 14. This transformation can be accomplished with two squeezers 35, 36 provided that the birefringence existing within the fiber between the polarization controller 16 and the polarizer 14 is negligible, which is approximately true over a limited path length. If the path length is such that the birefringence of the fiber optic wave guide 12 is not negligible between the polarization controller 16 and the polarizer 14, a third squeezer (not shown) will be required to produce the desired linear state of polarization for input to the polarizer 14. The required voltage and the force per unit length exerted on the fiber to produce the desired polarization change could be reduced, or the dynamic range of the polarization contoller 16 could be extended by increasing the length of the piezoelectric actuator element.

Referring to FIG. 5, a pair of fiber squeezers are placed in line with the fiber optic waveguide 12 passing therethrough. Each squeezer has a defined axis for applying stress to the fiber and in order to produce the desired polarization transformation, the axis of applied stress are arranged at 45° to one another. Each squeezer achieves a phase shift which is parallel to the axes of the squeezer and a second phase shift that is perpendicular to the sqeezer axis. Therefore, the pair of fiber squeezers 35, 36 are capable of changing the polarization along two axes perpendicular to one another and to the fiber optic waveguide 12.

It is preferable that the piezoelectric material used in the fiber squeezer have a Curie temperature greater than 85° C. The piezoelectric effect vanishes at temperatures greater than the Curie temperature, but this specification is easily met in practice by using a material such as lead titantate or lead zirconate. Such piezoelectric materials have Curie temperatures of about 300° C. Calculations show that a piezoelectric actuator element of a practical size having a height of about 8.9 millimeters, a length of about 6.4 millimeters and a thickness of about 3.2 millimeters and applied voltage of about 10 volts produces a phase change of 180° for fibers that are about 100 microns in diameter. A dynamic range of plus or minus 720° would thus require a control voltage range of 0 to 80 volts, which would produce forces on the fiber of approximately $8 \times 10^4$ dyne/cm, which is an order of magnitude below the threshhold force for causing damage to the fiber.

THE CONTROL SYSTEM

Referring again to FIGS. 1 and 2, the crystal 28 has a pair of planes 29, 31 thereon with a first photodetector 43 mounted to the plane 29 and a second photodetector 45 being mounted to the plane 31. The first photodetector 43 is arranged to have incident thereon light which was initally propagating from left to right in the fiber optic waveguide 12 and which was subsequently coupled out of the fiber optic waveguide 12 into the crystal 28. The second photodetector 45 is arranged to have incident thereon light which was initally traveling from right to left in the fiber optic waveguide 12 and which was coupled therefrom into the crystal 28. The first photodetector 43 outputs a signal to a first controller 47, which outputs control signals to the fiber squeezers 35 and 36, which are oriented as shown in FIG. 5 with respect to the fiber optic waveguide 12. The second photodetector 45 outputs control signals to a second controller 46 which outputs control signals to the pair of fiber squeezers 37 and 38. Thus the fiber optic polarizer system 10 is capable of producing light of a desired polarization output regardless of the direction of the input light signal.

An arbitrary state of polarization may be represented by components $E_x$ and $E_y$ where $E_x$ is represented as previously explained with reference to FIG. 3 by the encircled dot as being directed out of the plane of FIG. 3 and perpendicular to the fiber 12. E is also perpendicular to the fiber 12. The state of polarization of the incoming light may be defined by two parameters, A and $\Delta$, where $A^2 = E_x^2/E$, with E being equal to $E_x^2 + E_y^2$; and $\Delta$ is the phase difference between the x and y polarizations. Therefore, the incoming light may be expressed in a matrix representation as $$\frac{1}{|E|}\begin{bmatrix} E_x \\ E_y \end{bmatrix} = \begin{bmatrix} A \\ (1-A^2)^{\frac{1}{2}} \exp(i\Delta) \end{bmatrix} \quad (1)$$

The parameters to be controlled are $\Gamma_1$ and $\Gamma_2$, the differences between the parallel and orthogonal phase shifts by the fiber squeezers 35, 36 with respect to the squeezer axis. As illustrated, it is desired that the light input to the polarizer 14 and the light output therefrom have a polarization only in the y-direction. As described above, the crystal 28 couples light polarized in the x-direction travelling from left to right in the fiber optic waveguide 12 out of the fiber toward the first photodetector. If all of the light input to the polarizer 14 has the desired polarization, there will be no light incident through the crystal 28 upon the first photodetector 43. Therefore, the light incident upon the first photodetector 43 results in a photodetector output that is regarded as an error signal. The first controller 47 processes the error signal and then sends control signals to the fiber squeezers 35 and 36 to null the error signal. The error signal output from the photodetector 43 is a function of the phase differences $\Gamma_1$ and $\Gamma_2$, which are linear with respect to the control voltages applied to the fiber squeezers 35 and 36. The error signal voltage is given by $$S(\Gamma_1, \Gamma_2) = A^2 \cos(\Gamma_2/2) + (1-A^2) \sin^2(\Gamma_2/2) - A(1-A^2)^{\frac{1}{2}} \sin(\Gamma_2) \sin(\Gamma_1 - \Delta) \quad (2)$$

Figure 8:
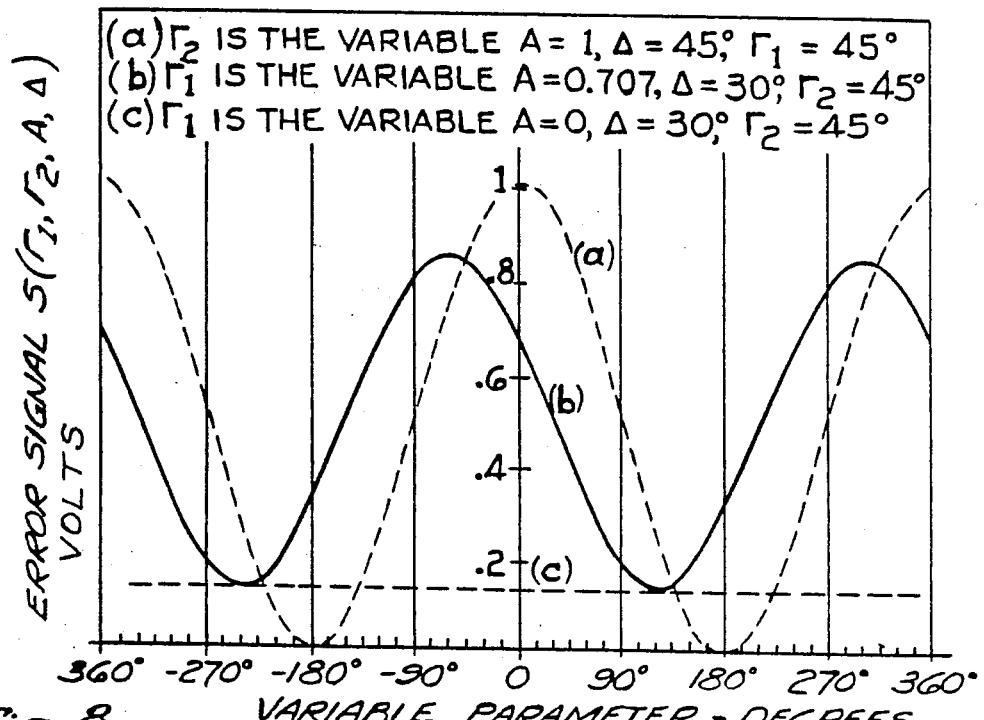
FIG. 8 shows graphs of the error signal output to the controller circuitry as functions of various parameters.

FIG. 8 illustrates computer plots of error signals for controlling the polarization input to the polarizer 14. Curve (a) uses $\Gamma_2$ as the variable with $A=1$, $\Delta=45°$ and $\Gamma_1=45°$. Curve (b) uses $\Gamma_1$ as the variable with $A=0.707$, $\Gamma=30°$ and $\Gamma_2=45°$. Curve (c) uses $\Gamma_1$ as the variable with $A=0$, $\Delta=30°$ and $\Gamma_2=45°$. For a given input state of polarization, the error signal varies sinusoidally with either of $\Gamma_1$ or $\Gamma_2$. In the special cases of $A=0$ or $A=1$, the error signal is independent of $\Gamma_1$, since in each of the special cases the coefficient of the term involving $\Gamma_1$ is 0. In these special cases, the incoming state of polarization is either parallel or orthogonal to the axis of the fiber squeezer 35. With a change in the control voltage applied to the fiber squeezer 35, the phase of the light may change by an amount equal to $\Gamma_1$, but the state of polarization will remain constant. If the incoming state of polarization is aligned with the axes of fiber squeezer 35, $\Gamma_2$ may be at $0\pm 2\pi$, $\pm\pi 4\pi$, etc. to obtain the desired output. If the incoming state of polarization is orthogonal to the fiber squeezer 35, $\Gamma_2$ may be at $\pm\pi$, $\pm 3\pi$, etc. to obtain the desired alignment of the polarization of the light in the fiber for input to the polarizer 14.

Figure 7:
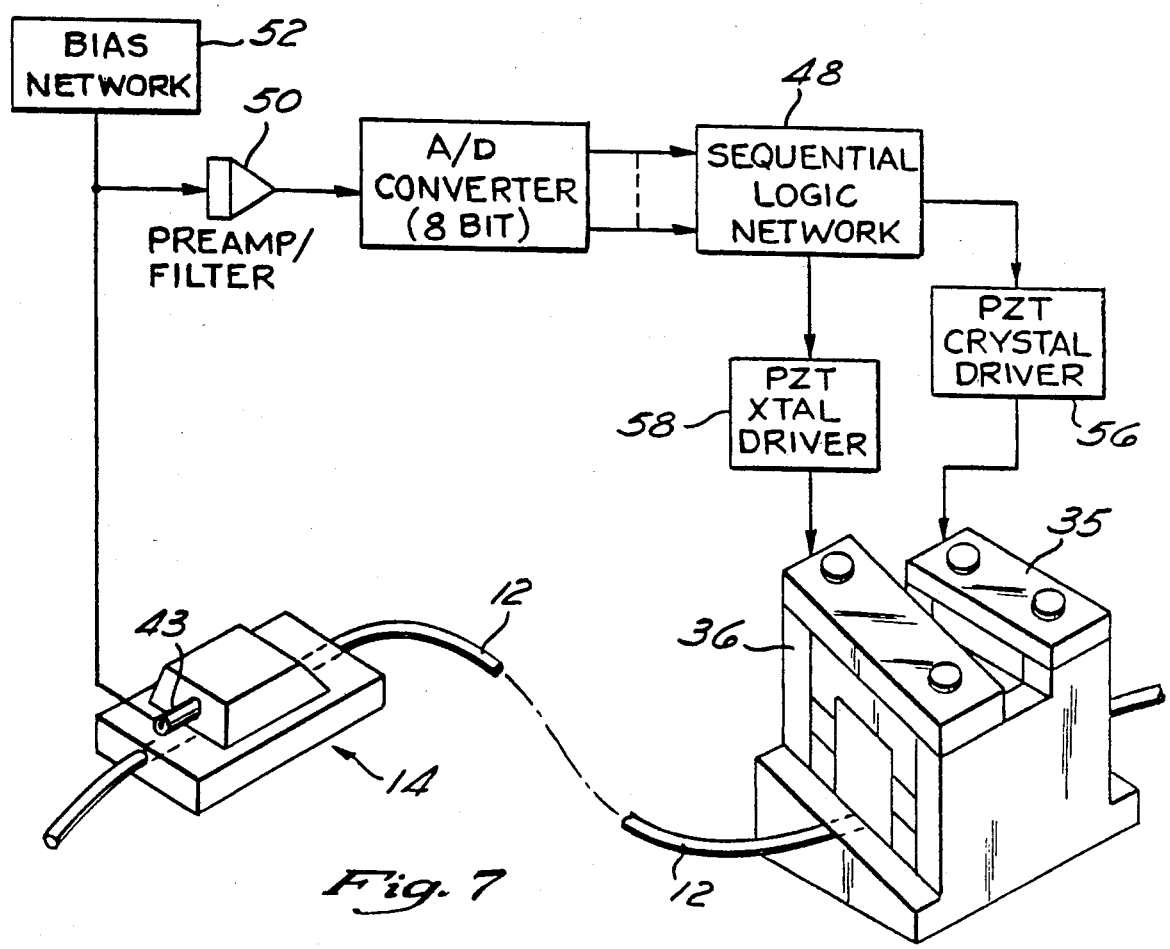
FIG. 7 is a schematic illustrating a second embodiment of the controller of FIG. 1.

The control signal will be obtained by modulations of $\Gamma_1$ and $\Gamma_2$ to observe the effect on the error signal. Modulation may be accomplished by an interative system such as that shown in FIG. 7 which uses a sequential logic network 48. The output of the photodetector 40 is input to a preamplifier and filter network 50, which also receives an input from an appropriate bias network 52. The amplified and filtered signal is input to an analog to digital converter 54, which may be an 8 bit A/D converter, for input to the sequential logic network 48. The sequential logic network 48 is programmed with an algorithm that drives the fiber squeezers 35 and 36 so as to minimize the output detected therefrom. In an iterative fashion, and by amounts proportional to the detected error signal, the sequential logic network 48 alternately applies corrections to the fiber squeezers 35 and 36 through a pair of crystal drivers 56 and 58, respectively, until a minimum error signal below a preselected value is reached. Since the sampling and correction rates are preferably greater than 2,000 per second, the noise generated in the sequential logic network 48 is well above the band width of the fiber optical system for gyroscopic applications. In general the noise generated can be placed outside the signal band of interest.

Referring to FIG. 6, an alternative approach to nulling the error signal utilizes continuous sinusoidal modulations of 1 and 2 at selected frequencies of $\omega_1$ and $\omega_2$. The output of the photodetector 43 is fed into a preamplifier 60 having an output connected to a demodulator 62. The demodulator 62 output is connected to an integrating and mixing circuit 64. A signal generator 66 outputs modulating signals at the frequencies of $\omega_1$ and $\omega_2$ to the demodulator 62 and to the integrating and mixing circuitry 64. The integrating and mixing circuitry 64 has outputs connected to each of the pair of crystal drivers 56 and 58 for supplying control signals to the fiber squeezers 35 and 36 respectively. Demodulation at frequencies $\omega_1$ and $\omega_2$ provides two control signals to drive the fiber squeezers 15 and 16 to produce the phase differences $\Gamma_1$ and $\Gamma_2$ to obtain simultaneous minima the DC error signal.

The polarizer system 10 according to the present invention operates according to the following specifications:

| | |
|---|---|
| Extinction ratio | >80 dB |
| Losses | <10% |
| Control band width | 500 Hz |
| Polarization noise suppression ratio | 40 dB |
| Cross-polarization suppression ratio | 20 dB |
| Design wave length | 820 nm |

Thus the fiber optic polarizer system 10 according to the present invention processes incoming light of an arbitrary polarization and produces an output light signal of a preselected polarization with minimal losses so that the polarizer system 10 is suitable for processing light signals for input to an all fiber gyroscope.

What is claimed is:

1. A system for producing light having a selected polarization state, comprising:
    a fiber optic waveguide having an interaction region;
    a fiber optic polarizer for coupling light of a first polarization out of said fiber optic waveguide at the interaction region while leaving light of a second polarization within said fiber optic waveguide; and
    processing means for processing light of the first polarization coupled out of said fiber optic waveguide to control the polarization of light before incidence upon said polarizer.

2. The system of claim 1 wherein said processing means comprises a photodetector responsive to light coupled out of said fiber optic waveguide for forming an error signal which is a function of the light intensity of the first polarization coupled out of the fiber optic wave guide and means for processing said error signal to adjust the polarization of light input to said polarizer to be said selected polarization.

3. The system of claim 2, wherein said controlling means further comprises:
    signal processing means for receiving said error signal and producing control signals in response thereto; and
    polarization controller means responsive to the control signals for adjusting the polarization of light incident upon said polarizer to reduce the error signal and to provide a constant intensity signal of the second polarization in the fiber optic waveguide.

4. The system of claim 1 wherein said fiber optic waveguide is a single mode optical fiber having a core and a cladding around the core and wherein said polarizer comprises:
    an interaction region in the optical fiber where an optical wave propagating therein has an evanescent field extending out of said optical fiber; and
    a birefringent material placed adjacent the interaction region, the cladding of said fiber at the interaction region having a thickness and said birefringent material having indices of refraction that cooperate to cause evanescent field coupling to couple light of the first polarization from the optical fiber into the birefringent material while light of the second polarization remains guided by the optical fiber.

5. The system of claim 3 wherein said polarization controller means comprises means for stressing said fiber optic waveguide to induce photoelastic birefringence therein to change the polarization of light propagating within said fiber optic waveguide to a predetermined state for input to said polarizer.

6. The system of claim 5 wherein said stressing means includes:

a first actuator for applying stress to said fiber optic waveguide along a first axis, said first actuator inducing in the light propagating within said fiber optic waveguide a first parallel phase shift and a first orthogonal phase shift relative to the first axis; and a second actuator for applying stress to the fiber optic waveguide along a second axis, said second actuator inducing in the light propagating within said fiber optic waveguide a second parallel phase shift and a second orthogonal phase shift relative to the second axis, the differences between the first and second parallel phase shifts and the first and second orthogonal phase shifts determining the polarization of light output from said polarization controller means.

7. The system of claim 6 wherein said first and second actuators each include a piezoelectric actuator element responsive to an applied electric field to apply stress to said fiber optic waveguide.

8. The system of claim 6 wherein said signal processing means includes:

means for converting the error signal into a digital signal;

a sequential logic network connected to said converting means for sequentially sampling the digital signal and producing outputs in response to the sampled digital error signal to modulate the difference between the first and second parallel phase shifts and the difference between the first and second orthogonal phase shifts to minimize the error signal.

9. The system of claim 6 wherein said control means includes;

a demodulator connected to said photodetector to receive the error signal therefrom;

a signal generator connected to said demodulator to apply input signals thereto, said signal generator supplying a signal of a first frequency to said demodulator to modulate the difference between the first parallel phase shift and the first orthogonal phase shift, said signal generator supplying a signal of a second frequency to said demodulator to modulate the difference between the second parallel phase shift and the second orthogonal phase shift; and an integrating and mixing circuit connected to said demodulator and to said signal generator to receive signals therefrom, said integrating and mixing circuitry supplying output signals to the first and second actuators to modulate the error signal by an amount proportional to the rate of change of the error signal with time to minimize the error signal.

10. A system for producing light having a selected polarization state, comprising:

a fiber optic waveguide having an interaction region formed thereon;

a fiber optic polarizer including a birefringent crystal having a portion thereof positioned within the evanescent field of light propagating in the fiber optic waveguide at the interaction region, said birefringent crystal having a first index of refraction which couples light of a first selected polarization out of said fiber optic waveguide and a second index of refraction which causes light of a second selected polarization to remain guided by said fiber optic waveguide:

detector means positioned to receive light coupled out of said fiber optic waveguide for forming an error signal;

signal processing means for receiving the error signal and producing a control signal in response thereto; and polarization controller means responsive to the control signal for adjusting the polarization of light incident upon said polarizer to null the error signal and to provide an output signal from said polarizer guided by said fiber optic waveguide and having a selected polarization state.

11. The system of claim 10 wherein said polarization controller means comprises means for stressing said fiber optic waveguide to induce photoelastic birefringence therein to change the polarization of light propagating within said fiber optic waveguide to a predetermined state for input to said polarizer.

12. The system of claim 11 wherein said stressing means includes:

a first actuator for applying stress to said fiber optic waveguide along a first axis, said first actuator inducing in the light propagating within said fiber optic waveguide a first parallel phase shift and a first orthogonal phase shift relative to the first axis; and a second actuator for applying stress to the fiber optic waveguide along a second axis, said second actuator inducing in the light propagating within said fiber optic waveguide a second parallel phase shift and a second orthogonal phase shift relative to the second axis, the differences between the first and second parallel phase shifts and the first and second orthogonal phase shifts determining the polarization of light output from said polarization controller means.

13. The system of claim 12 wherein each of said first and second actuators includes a piezoelectric actuator element responsive to an applied electric field to apply stress to said fiber optic waveguide.

14. The system of claim 10 wherein said signal processing means includes:

means for converting the error signal into a digital signal; and a sequential logic network connected to said converting means for sequentially sampling the digital signal and producing outputs in response to the sampled digital signal to modulate the difference between the first and second parallel phase shifts and the difference between the first and second orthogonal phase shifts to minimize the error signal.

15. The system of claim 10 wherein said control means includes a demodulator connected to said photodetector to receive the error signal therefrom;

a signal generator connected to said demodulator to apply input signals thereto, said signal generator supplying a signal of a first frequency to said demodulator to modulate the difference between the first parallel phase shift and the first orthogonal phase shift, said signal generator supplying a signal of a second frequency to said demodulator to modulate the difference between the second parallel phase shift and the second orthogonal phase shift; and an integrating and mixing circuit connected to said demodulator and to said signal generator to receive signals therefrom, said integrating and mixing circuitry supplying output signals to the first and second actuators to modulate the error signal by an amount proportional to the rate of change of the error signal with time to minimize the error signal.

16. A method for producing light having a selected polarization state, comprising the steps of:
   supplying a light input to a fiber optic waveguide having an interaction region;
   coupling light of a first polarization out of the fiber optic waveguide with a fiber optic polarizer at the interaction region while retaining light of a second polarization within the fiber optic waveguide;
   detecting light of the first polarization coupled out of the fiber optic waveguide;
   forming an error signal proportional to the detected light; and
   adjusting the polarization of light within the fiber optic waveguide to null the error signal.

17. The method of claim 16, further including the steps of:
   digitizing the error signal to form a digital signal;
   sampling the digital signal;
   producing control signals in response to the sampled digital signal; and
   applying the control signals to a polarization controller to adjust the polarization to null the error signal.

18. A method for producing light of a selected polarization, comprising the steps of:
   forming an interaction region in a fiber optic waveguide wherein a light wave propagated by the fiber optic waveguide has an evanescent field extending out of said fiber optic waveguide;
   placing a birefringent material adjacent the interaction region such that a portion of the evanescent field extends into the birefringent material, the birefringent material having a pair of refractive indicies that cooperate at the interaction region, to couple light of a first polarization from the fiber optic waveguide into a bulk wave in the birefringent material while light of a second polarization is guided by the fiber optic waveguide past the interaction region; and
   processing light of the first polarization coupled from the fiber optic waveguide at the interaction region to maximize the intensity of the second polarization before incidence of light of said first polarization upon said interaction region.

19. A system for producing light having a selected polarization in an optical fiber without removing light of the selected polarization from the fiber, comprising:
   a fiber optic waveguide;
   a fiber optic polarizer for removing light of an undesired polarization from the fiber optic waveguide while permitting light of the selected polarization to be guided by the fiber optic waveguide;
   means responsive to the intensity of the undesired polarization coupled from the fiber optic waveguide for controlling the polarization of light before input to said polarizer to produce a signal of constant intensity and the selected polarization output from said polarizer.

20. A system for producing light having a selected polarization state in a pair of light waves that propagate in opposite directions in an optical fiber, comprising:
   an interaction region formed on the optical fiber;
   a fiber optic polarizer for coupling light of a first polarization in both light waves out of the optical fiber at the interaction region while leaving light of a second polarization in both light waves within the optical fiber;
   means for detecting light from a first one of the light waves that has been coupled out of the fiber;
   first processing means for processing light from the first wave coupled out of said fiber optic waveguide to control the polarization of light incident upon said polarizer;
   means for detecting light from a second one of the light waves that has been coupled out out of the fiber; and
   second processing means for processing light from the second wave coupled out of said fiber optic waveguide to control the polarization of light before incidence upon said polarizer.

21. A method for producing light having a selected polarization state in a pair of light waves that propagate in opposite directions in an optical fiber, comprising:
   forming an interaction region on the optical fiber;
   coupling light of a first polarization in both light waves out of the optical fiber with a fiber optic polarizer at the interaction region while leaving light of a second polarization in both light waves within the optical fiber;
   detecting light from a first one of the light waves that has been coupled out out of the fiber;
   processing light from the first wave coupled out of said fiber optic waveguide to control the polarization of light incident upon said polarizer;
   detecting light from a second one of the light waves that has been coupled out out of the fiber; and
   processing means for processing light from the second wave coupled out of said fiber optic waveguide to control the polarization of light before incidence upon said polarizer.

* * * * *